United States Patent Office 3,305,261
Patented Feb. 21, 1967

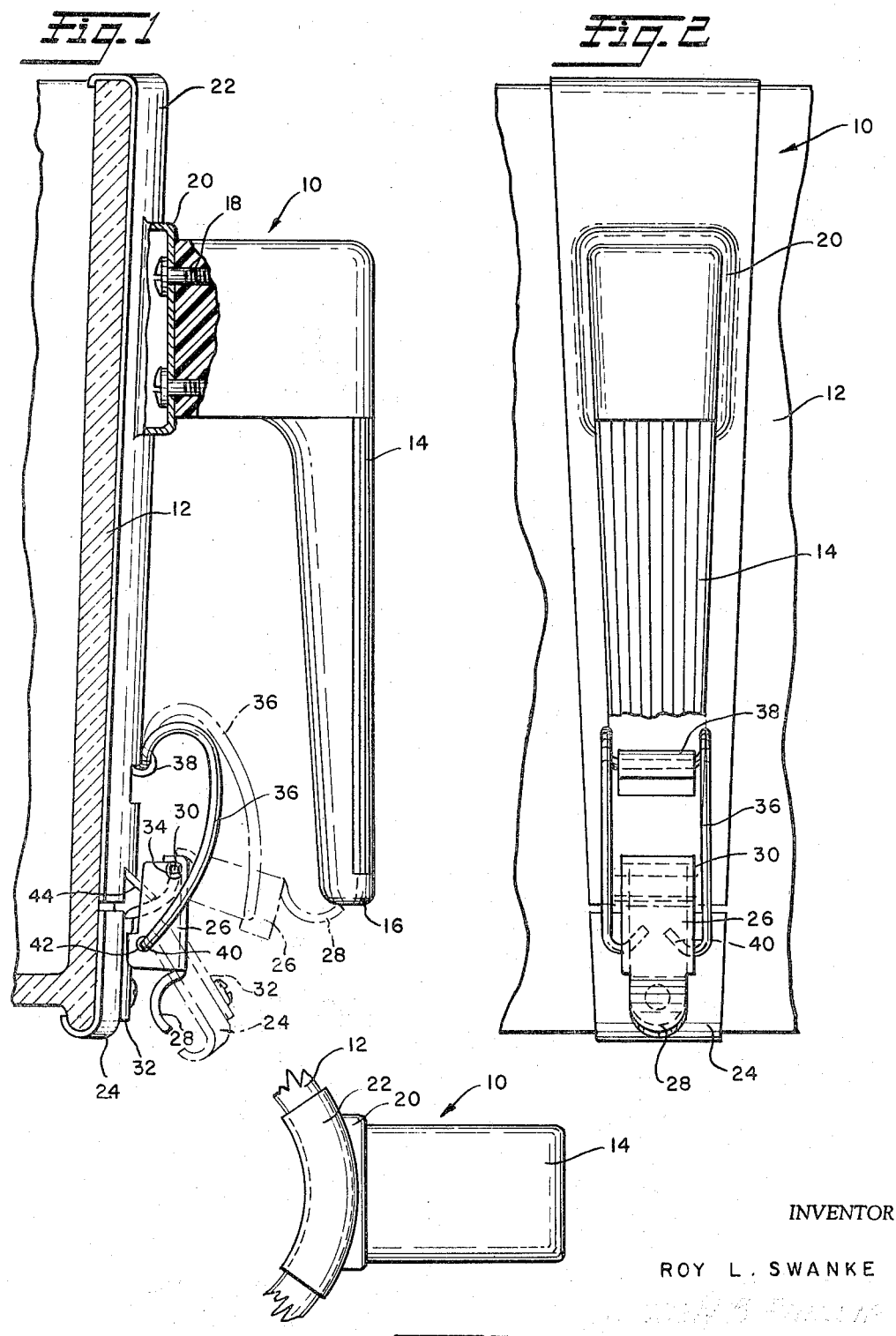

3,305,261
REMOVABLE HANDLE
Roy L. Swanke, Newington, Conn., assignor to Dynamics Corporation of America, New York, N.Y., a corporation of New York
Filed July 28, 1965, Ser. No. 475,483
7 Claims. (Cl. 294—16)

This invention relates to improvements in removable handles for containers or other devices and is concerned more particularly with removable handles especially adapted for use with the jars of electric motor driven blenders such as the Waring Blendor.

It is well known that the molded glass jars commonly used in electric motor driven blenders are often subject to relatively wide tolerances in specific dimensions and it is the principal object of the present invention to provide a removable handle which will compensate for such tolerances and securely fit all of such jars regardless of variations in dimensions.

Another object of the invention is to provide a removable handle having a spring clamping lever which is compactly housed in the handle assembly and which is controlled as to movement when in open position for convenience of storage when the handle is not in use.

A further general object of the invention is to provide a removable handle which is simple in construction and operation and durable and efficient in use.

Other and further objects will be apparent from the following detailed description taken in conjunction with the accompanying drawings wherein a preferred embodiment of the principles of the invention has been selected for exemplification.

In the drawings:

FIG. 1 is a side elevational view partially broken away of a removable handle, constructed in accordance with the present invention, shown operatively secured to a container indicated in fragment, the broken lines indicating the manner in which the handle may be attached to or removed from the container;

FIG. 2 is a front view of FIG. 1 with the lower portion of the handle member removed to show the operative connection of the clamping lever between the top and bottom container engaging straps; and FIG. 3 is a top view of FIGS. 1 and 2.

Referring more particularly to the drawings, wherein like numerals refer to like parts, a removable handle constructed in accordance with the present invention and indicated in its entirety by 10 is shown attached to a container 12. The container 12 may be an electric motor driven blender jar from which the handle must be frequently removed for cleaning of the jar and storage, such as in the case of the lobular container characteristic of the Waring Blendor for which the handle 10 is particularly adapted. However, it is to be understood that the handle of the present invention is also adapted for use with any other type of container or device for which a removable handle is desired.

As shown in FIGS. 1 and 2, the removable handle 10 comprises an upright handle member 14 having a lower end portion 16 and secured as indicated at 18 to a recessed portion 20 of a top container engaging strap 22. A bottom container engaging strap 24 is generally free of the handle member 14 but is operatively connected to the top strap 22, as hereinafter described, so that the handle member 14 may be selectively secured to the container 12 or loosened therefrom for removal, as desired, as the straps 22 and 24 are shifted relatively toward or apart from each other.

For relatively moving the straps 22 and 24, a clamping lever 26, preferably having an arcuate finger engaging end extremity 28, is pivotally supported by the bottom strap 24, such as by the lugs 30 projecting laterally of opposed sides of a bracket 32 riveted or otherwise secured to the bottom strap 24, the said lugs 30 being engaged in apertures 34 provided in the flanged sides of the clamping lever 26. Preferably, the lower end portion 16 of the handle member 14 and the end extremity 28 of the lever 26 are relatively so positioned that the handle end 16 engages the lever end 28 to stop upward movement of the lever 26 as indicated by the broken lines showing in FIG. 1.

The clamping lever 26 is connected to the top container engaging strap 22 by spring means preferably in the form of outwardly bowed wire spring arms 36, as shown. The spring 36 is supported at its upper end by a reversely bent flange 38 struck out of the strap 22 and the inturned lower extremities 40 of the spring 36 are pivotally engaged in opposed apertures 42 provided in the flanged sides of the clamping lever 26. A second flange 44 struck out of the bottom portion of the top strap 22 and slanted downwardly is adapted slidably to engage the lever supporting bracket 32 generally to guide the movements of the lever 26. For more effective snap action control of the clamping lever 26 the hinge connections 38 and 42 of the spring 36 are off-centered inwardly of the pivotal connection 30 of the lever to the bottom strap 24.

As will be apparent, particularly from the solid and broken line showings in FIG. 1, the handle 10 of the present invention may be readily attached to the container 12 by fitting the top strap 22 to a top side wall of the container, loosely engaging the bottom strap 24 as shown in broken lines with the bottom side wall and then finger pressing the extremity 28 downwardly so that the tension of spring 36 and the clamping action urges the straps toward each other in firm locking engagement with the side wall of the container as shown in the solid lines. As will be noted in such solid lines the straps 22 and 24 are still spaced slightly apart so as readily also to fit a container side wall of slightly lesser height and are adapted, because of the resiliency of spring 36, of being spaced a greater distance apart so as equally as readily to fit a container side wall of greater height.

As will also be apparent, the handle 10 is easily removed from the container 12 by finger pressing the extremity 28 outwardly to loosen the straps and to bring the bottom strap 24, clamping lever 26 and spring 36 into their broken line open positions as shown in FIG. 1. Although the members 24, 26 and 36 will then be loosely in engagement they will be compactly housed in the handle assembly by the guide flange 44 and abutment of the lever extremity 28 against the handle member end 16 for compactness in storage and ready availability for reuse of the handle.

It is to be understood that the present invention is not confined to the precise construction and arrangement of parts herein illustrated and described but embraces all such modifications thereof as come within the scope of the following claims.

I claim:
1. A removable handle for an upright container which comprises,
   an upright handle member having a lower end portion;
   a top container engaging strap secured to said handle member;
   a bottom container engaging strap free of said handle member;
   a clamping lever pivotally supported by said bottom strap;
   spring means pivotally connected to said top strap and to said clamping lever;
   the said clamping lever being adapted to be pressed downwardly in closed position whereby the tension of said spring means urges said straps toward each other in secured engagement with top and bottom portions of said container;

and the said clamping lever being also adapted to be snapped upwardly in open position to release the tension of said spring means and to loosen said straps whereby to permit removal of said handle from said container;

the said lower end portion of the handle member being so positioned as to engage said clamping lever and stop its upward movement.

2. The handle of claim 1 wherein the pivotal connection of the spring means to the top strap and clamping lever is offset inwardly of the pivotal connection of the clamping lever to the bottom strap.

3. The handle of claim 1 wherein the spring means comprises outwardly bowed spring wire means.

4. The handle of claim 2 wherein the spring means comprises outwardly bowed spring wire means.

5. The handle of claim 1 wherein the clamping lever includes a finger engaging end extremity and said end extremity engages the lower end portion of the handle member.

6. A removable handle for an upright container which comprises,
 an upright handle member;
 a top container engaging strap secured to said handle member;
 a bottom container engaging strap free of said handle member;
 a clamping lever pivotally supported by said bottom strap;
 and spring means interconnecting said top strap and said clamping lever whereby operatively to connect said straps for selective attachment or removal of the handle relative to the container upon movement of said clamping lever.

7. A removable handle for an upright container which comprises,
 a top container engaging strap;
 a bottom container engaging strap;
 an upright handle member secured to one of said straps;
 a clamping lever pivotally supported by the other of said straps;
 And spring means interconnecting said handle member secured strap and said clamping lever whereby operatively to connect said straps for selective attachment or removal of the handle relative to the container upon movement of said clamping lever.

References Cited by the Examiner
UNITED STATES PATENTS

| | | | |
|---|---|---|---|
| 2,441,892 | 5/1948 | Mattoon | 294—31.2 |
| 3,261,635 | 7/1966 | Talay | 294—29 |

GERALD M. FORLENZA, *Primary Examiner.*

G. F. ABRAHAM, *Assistant Examiner.*